(12) United States Patent
Peterson et al.

(10) Patent No.: US 10,033,210 B2
(45) Date of Patent: Jul. 24, 2018

(54) POWER SUPPLY FOR USE WITH A SLOW-RESPONSE POWER SOURCE

(71) Applicant: Microsoft Corporation, Redmond, WA (US)

(72) Inventors: Eric C. Peterson, Woodinville, WA (US); Shaun L. Harris, College Station, TX (US); Sean M. James, Olympia, WA (US); John J. Siegler, Carnation, WA (US); Jie Liu, Medina, WA (US); Aman Kansal, Redmond, WA (US)

(73) Assignee: Micrsoft Technology Licensing, LLC, Redmond, WA (US)

( * ) Notice: Subject to any disclaimer, the term of this patent is extended or adjusted under 35 U.S.C. 154(b) by 817 days.

(21) Appl. No.: 14/169,088

(22) Filed: Jan. 30, 2014

(65) Prior Publication Data
US 2015/0214771 A1     Jul. 30, 2015

(51) Int. Cl.
| H02J 7/34 | (2006.01) |
| H02J 1/10 | (2006.01) |
| H02J 7/00 | (2006.01) |
| G05B 13/02 | (2006.01) |
| G06F 1/26 | (2006.01) |
| H01M 10/46 | (2006.01) |

(52) U.S. Cl.
CPC .......... *H02J 7/0068* (2013.01); *G05B 13/021* (2013.01); *G06F 1/263* (2013.01); *H01M 10/46* (2013.01); *Y10T 307/32* (2015.04)

(58) Field of Classification Search
USPC .............................................. 307/20, 52, 66
See application file for complete search history.

(56) References Cited

U.S. PATENT DOCUMENTS

| 4,238,690 A | 12/1980 | Clarke |
| 4,488,057 A | 12/1984 | Clarke |
(Continued)

FOREIGN PATENT DOCUMENTS

| CN | 1274188 A | 11/2000 |
| EP | 0243061 A2 | 10/1987 |
(Continued)

OTHER PUBLICATIONS

International Preliminary Report on Patentability dated May 3, 2016 from PCT Patent Application No. PCT/US2015/012555, 9 pages.
(Continued)

*Primary Examiner* — Rexford Barnie
*Assistant Examiner* — Dru Parries
(74) *Attorney, Agent, or Firm* — Rainier Patents, P.S.

(57) ABSTRACT

A power supply is described herein which provides power to a load, such as a load including one or more computing devices. The power supply uses a slow-response power source (such as a fuel-driven mechanism) to handle a slow-moving component of the demand level presented by the load, and uses a fast-response power source (such as a battery or a capacitor, etc.) to handle a fast-moving component of the demand level. By virtue of this approach, the power supply can manage the load level as it appears to the slow-response power source, allowing, in turn, the slow-response power source to service even fast-changing loads—a task which it could not otherwise perform due to its native limitations.

21 Claims, 12 Drawing Sheets

(56) References Cited

U.S. PATENT DOCUMENTS

| | | | |
|---|---|---|---|
| 4,564,767 A | 1/1986 | Charych | |
| 4,931,947 A | 6/1990 | Werth et al. | |
| 5,210,685 A | 5/1993 | Rosa | |
| 5,289,045 A | 2/1994 | Lavin et al. | |
| 5,670,833 A | 9/1997 | Mengelt et al. | |
| 5,781,422 A | 7/1998 | Lavin et al. | |
| 6,212,081 B1 | 4/2001 | Sakai | |
| 6,657,320 B1 | 12/2003 | Andrews et al. | |
| 2004/0032237 A1 | 2/2004 | Dykeman | |
| 2006/0103242 A1 | 5/2006 | Lin | |
| 2009/0021078 A1 | 1/2009 | Corhodzic et al. | |
| 2009/0195230 A1 | 8/2009 | Adkins et al. | |
| 2009/0230772 A1* | 9/2009 | Caudill | H02J 3/46 307/44 |
| 2010/0232180 A1 | 9/2010 | Sase et al. | |
| 2010/0295700 A1 | 11/2010 | Mauk et al. | |
| 2010/0315849 A1 | 12/2010 | Ingemi et al. | |
| 2011/0072290 A1 | 3/2011 | Davis et al. | |
| 2011/0096522 A1 | 4/2011 | Humphrey et al. | |
| 2011/0156480 A1 | 6/2011 | Park | |
| 2011/0304211 A1 | 12/2011 | Peterson et al. | |
| 2011/0316338 A1 | 12/2011 | Peterson et al. | |
| 2012/0146587 A1 | 6/2012 | Srinivasan et al. | |
| 2012/0293000 A1 | 11/2012 | Fan et al. | |
| 2012/0331317 A1 | 12/2012 | Rogers et al. | |
| 2013/0007515 A1 | 1/2013 | Shaw et al. | |
| 2013/0163192 A1 | 6/2013 | Ballantine et al. | |
| 2013/0253716 A1 | 9/2013 | Gross et al. | |
| 2013/0257160 A1 | 10/2013 | Harris et al. | |
| 2013/0285446 A1* | 10/2013 | Chow | H02J 3/32 307/18 |
| 2013/0307339 A1 | 11/2013 | Subramanium et al. | |
| 2014/0062191 A1* | 3/2014 | Bryson | H02J 1/12 307/26 |
| 2015/0021992 A1 | 1/2015 | Toya | |
| 2017/0005513 A1 | 1/2017 | Harris et al. | |

FOREIGN PATENT DOCUMENTS

| | | |
|---|---|---|
| WO | 96/22627 A1 | 7/1996 |
| WO | 2013/151949 A1 | 10/2013 |
| WO | 2013/179661 A1 | 12/2013 |

OTHER PUBLICATIONS

Written Opinion of the International Preliminary Examining Authority dated Dec. 23, 2015 from PCT Patent Application No. PCT/US2015/012555, 9 pages.
Demand under Article 31 filed Aug. 3, 2015 from PCT Patent Application No. PCT/US2015/012555, 22 pages.
International Preliminary Report and Written Opinion dated Oct. 7, 2014 from PCT Patent Application No. PCT/US2013/034871, 5 pages.
First Office Action dated Aug. 1, 2014 from China Patent Application No. 201310116343.X, 10 pages.
Non-Final Office Action dated Nov. 25, 2014 from U.S. Appl. No. 13/438,540, 22 pages.
Amendment/Response filed Jan. 24, 2015 to Non-Final Office Action dated Nov. 25, 2014 from U.S. Appl. No. 13/438,540, 16 pages.
Final Office Action dated Apr. 2, 2015 from U.S. Appl. No. 13/438,540, 29 pages.
Amendment/Response filed Jun. 23, 2015 to Final Office Action dated Apr. 2, 2015 from U.S. Appl. No. 13/438,540, 21 pages.
Non-final Office Action dated Jul. 9, 2015 from U.S. Appl. No. 13/438,540, 23 pages.
Lui, et al., "Study on Scheduling Strategies of Hybrid Wind/PV/Storage Power System," in Proceedings of the 5th International Conference on Electricity Distribution (CICED), Sep. 2012, 5 pages.
Wang, et al., "Optimal Reserved Water of Pumped Storage Power Station for Black-Start," in Proceedings of the 8th International Power Engineering Conference, Dec. 2007, 5 pages.
Search Report and Written Opinion in PCT/US2015/012555, dated Apr. 20, 2015, 14 pages.
"Power and Cooling Solutions," available at <http://www.compucallinc.com/liebert-ups-power-liebert-cooling-solutions/>, Compu-Call, Inc., accessed on Oct. 13, 2011, 3 pages.
Loeffler, Chris, "What Your IT Equipment Needs from a UPS," available at «http://lit.powerware.com/ll_download_bylitcode.asp?doc_id=11666», Eaton Corporation, 2009, 11 pages.
"XP Power Supply Technical Guide," available at «http://www.xppower.com/pdfs/techguide.pdf», XP power plc, 2007, 152 pages.
International Search Report for PCT Patent Application No. PCT/US2013/034871, dated Sep. 23, 2013, 4 pages.
Riekstin, et al., "No More Electrical Infrastructure: Towards Fuel Cell Powered Data Centers," In Proceedings of the Workshop on Power-Aware Computing and Systems, Nov. 3, 2013, 5 pages.
Aksanli, et al., "Architecting Efficient Peak Power Shaving Using Batteries in Data Centers," In Proceedings of the International Symposium on Modeling, Analysis and Simulation of Computer and Telecommunication Systems (MASCOTS), Aug. 14, 2013, 12 pages.
Kontorinis, et al., "Managing Distributed UPS Energy for Effective Power Capping in Data Centers," In Proceedings of the 39th Annual International Symposium on Computer Architecture, Jun. 9, 2012, 12 pages.
Response filed Oct. 9, 2015 to the Non-Final Office Action dated Jul. 9, 2015 from U.S. Appl. No. 13/438,540, 12 pages.
Final Office Action dated Jan. 21, 2016 from U.S. Appl. No. 13/438,540, 27 pages.
After Final Consideration Pilot Program Request and Response filed Apr. 6, 2016 to the Final Office Action dated Jan. 21, 2016 from U.S. Appl. No. 13/438,540, 18 pages.
Applicant-Initiated Interview Summary dated Apr. 22, 2016 from U.S. Appl. No. 13/438,540, 3 pages.
Notice of Allowance and After Final Consideration Pilot Program Decision dated May 3, 2016 from U.S. Appl. No. 13/438,540, 8 pages.
Second Office Action dated Jun. 18, 2015 from Chinese Patent Application No. 201310116343.X, 9 pages.
Request for Restoration of Right and Response filed Mar. 17, 2016 to the Second Office Action dated Jun. 18, 2015 from Chinese Patent Application No. 201310116343.X, 12 pages.
Third Office Action dated Jul. 19, 2016 from Chinese Patent Application No. 201310116343.X, 7 pages.
Response filed Sep. 23, 2016 to the Third Office Action dated Jul. 19, 2016 from Chinese Patent Application No. 201310116343.X, 8 pages.
Notification on Grant of Patent Right for Invention dated Dec. 6, 2016 from Chinese Patent Application No. 201310116343.X, 5 pages.
Peterson et al., "Power Supply for Use with a Slow-Response Power Source", PCT Patent Application No. PCT/US2015/012555, filed Jan. 23, 2015, 42 pages.
Preliminary Amendment filed Sep. 16, 2016 from U.S. Appl. No. 15/233,924, 10 pages.

* cited by examiner

LOAD BEHAVIOR

POSSIBLE EFFECTS (WITHOUT AMELIORATION)

- SUPPLY OF EXTRA CURRENT FROM THE BATTERY; AND/OR
- REDUCE NON-CRITICAL LOAD PROCESSES

POSSIBLE EFFECTS (WITH AMELIORATION)

POWER SUPPLY FOR USE WITH A SLOW-RESPONSE POWER SOURCE

BACKGROUND

A fuel-driven mechanism (such as a fuel cell, generator, etc.) may be used to provide power to a load. A fuel-driven mechanism, however, responds relatively slowly to changes in the load level presented by the load, and is thus not well suited for handling dramatic deviations in load level. This characteristic complicates the use of a fuel-driven mechanism as a power source.

SUMMARY

A power supply is described herein for delivering power to a load, such as a load that includes one or more computing devices. The power supply draws power from a slow-response power source, such as a fuel cell, generator, etc. The power supply also includes, or otherwise has access to, a fast-response power source (such as a battery, capacitor, etc.), and a charger for charging the fast-response power source. The slow-response power source is characterized in that it is less responsive to changes in the load level, presented by the load, compared to the fast-response power source.

The power supply further includes control logic for controlling the power supply in the following illustrative manner. For a first state in which the load level is not changing at a rate that is too great for the slow-response power source to handle, the control logic instructs the power supply to primarily use the slow-response power source to provide power to the load. For a second state in which the load level is increasing at a rate that is too high for the slow-response power source to handle without amelioration by the power supply, the control logic instructs the power supply to use the fast-response power source to assist the slow-response power source in providing power to the load. For a third state in which the load level is decreasing at a rate that is too high for the slow-response power source to handle without amelioration by the power supply, the control logic instructs the power supply to discharge excess energy. More specifically, the power supply may discharge excess energy by: using the charger to charge the fast-response power source; and/or diverting power to one or more power sinks.

In other words, the power supply uses the slow-response power source to handle a slow-moving component of the demand level presented by the load, and uses the fast-response power source to handle a fast-moving component of the demand level. By virtue of these techniques, the power supply dynamically makes various changes that modify the demands imposed by the load, as the load appears to the slow-response power source. These techniques, in turn, allow the slow-response power source to successfully handle even dramatic changes in load level, that, without the ameliorative effects of the power supply, might have exceeded the native capabilities of the slow-response power source.

According to another illustrative feature, a power sink may correspond to a local and/or external resistive load bank. Alternatively, or in addition, a power sink may correspond to a process associated with the load that is initiated or modified to consume excess power.

According to another illustrative feature, the control logic is configured to use the charger to charge the fast-response power source to a specified charge level. The specified charge level is chosen to place the fast-response power source in a most appropriate condition to handle a subsequent possible load change event, e.g., by placing the fast-response power source in a condition such that it can readily absorb energy in the event of a rapid decrease in load level, or discharge energy in the event of a rapid increase in the load level.

The above approach can be manifested in various types of systems, devices, components, methods, computer readable storage media, data structures, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

Figure 1:
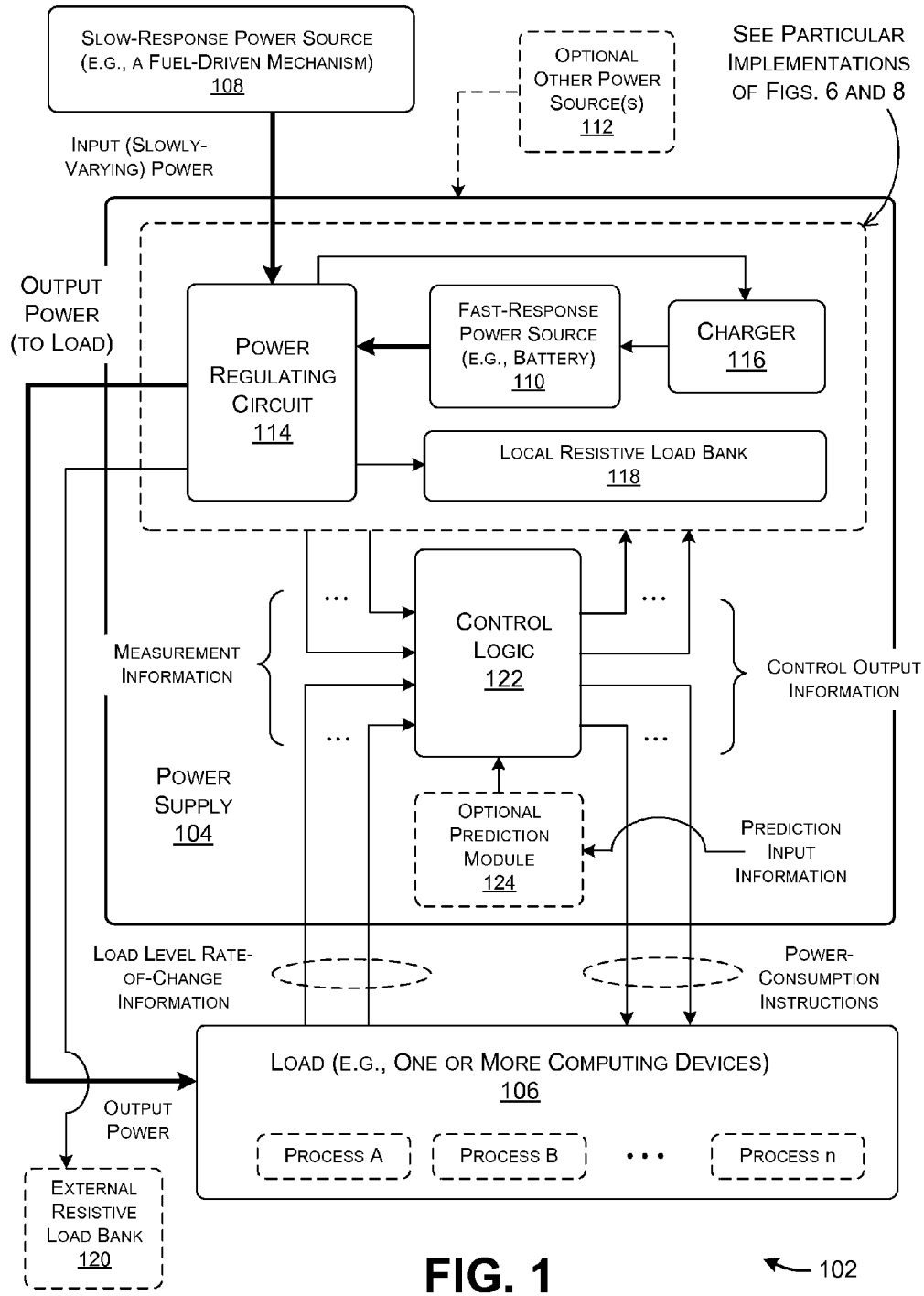
FIG. 1 shows an overview of a power supply for providing power to a load. The power supply uses a fuel-driven mechanism (or other slow-response power source) in conjunction with a battery (or other fast-response power source).

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative power supply for supplying power to a load based on power received from a fuel-driven mechanism or other slow-response power source. Section B sets forth illustrative methods which explain the operation of the power supply of Section A. Section C describes illustrative computing functionality that can be used to implement control logic used by the power supply.

As a preliminary matter, some of the figures describe concepts in the context of one or more structural components, variously referred to as functionality, modules, features, elements, etc. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software running on computer equipment, hardware (e.g., chip-implemented logic functionality), etc., and/or any combination thereof.

As to terminology, the term "logic" encompasses any physical and tangible functionality for performing a task. For instance, each operation illustrated in the flowcharts corresponds to a logic component for performing that operation. A logic component may be configured to perform its corresponding operation using, for instance, software running on computer equipment, hardware (e.g., chip-implemented logic functionality), etc., and/or any combination thereof. When implemented by computing equipment, a logic component represents an electrical component that is a physical part of the computing system, however implemented.

Further, the following explanation may identify one or more features as "optional." This type of statement is not to be interpreted as an exhaustive indication of features that may be considered optional; that is, other features can be considered as optional, although not expressly identified in the text. Further, a reference to a single entity (such as a power source, process, etc.) in the description and claims is not intended to exclude implementations that include two or more entities of the same type (e.g., two or more power sources, two or more processes, etc.). Finally, the terms "exemplary" or "illustrative" refer to one implementation among potentially many implementations.

A. Illustrative Power Supply

FIG. 1 shows an environment 102 in which a power supply 104 delivers power to a load 106. The load 106 may correspond to any equipment that operates based on electrical power. In one case, for instance, the load 106 may correspond to one or more computing devices provided at a data center. In another case, the load 106 may correspond to any type of personal computing device. In another case, the load 106 may correspond to an individual component of a computing device.

At any given point in time, the load 106 is performing a certain amount of work, as reflected by a load level. The load level also corresponds to the amount of power that is required to perform the work. Multiple factors contribute to the load level of a computing device at any given time, such as the activity levels of the device's central processing units (CPUs), the speeds of the device's fans, the on/off states of the device's visual indicators and displays, and so on. The load level may increase or decrease very quickly, e.g., within a fraction of a second.

The power supply 104 draws power from at least two sources. A first power source corresponds to slow-response power source 108. A second power source corresponds to a fast-response power source 110. The slow-response power source 108 is so-named because it less responsive to changes in the load level of the load 106 compared to the fast-response power source 110. The power supply 104 may optionally receive electrical power from one or more other power sources 112, such as a grid-connected public utility source. FIG. 1 shows that the fast-response power source 110 corresponds to a component within the power supply 104, while the slow-response power source 108 corresponds to a component that is external to the power supply 104. This arrangement indeed corresponds to one viable embodiment; but in other cases, the fast-response power source 110 corresponds to a component that is external to the power supply 104 (and connected to the power supply 104 through an interface), and/or the slow-response power source 108 corresponds to a component that is internal to the power supply 104.

In one particular implementation, the slow-response power source 108 corresponds to a fuel-driven (FD) energy-generating mechanism, such as a fuel cell, a generator, etc. A fuel cell corresponds to any type of device which converts the chemical energy of a fuel (such as natural gas) directly into electricity through the chemical reaction of the fuel with an agent, such as oxygen. A generator corresponds to any type of device that uses any type of engine to convert, through combustion, the chemical energy of a fuel into mechanical motion energy, and then converts the motion energy into electricity. In any event, a fuel-driven mechanism leverages some kind of process to generate electricity, where that process takes a finite amount of time to complete. As such, a fuel-driven mechanism cannot instantly increase or decrease power in response to an instruction to do so. For example, for a generator, it takes a certain amount of time to feed additional fuel to the combustion mechanism of the generator, and then it takes a certain amount of time for the combustion mechanism to consume the additional fuel. For example, a fuel-driven mechanism may have a time lag of one or more seconds before it can respond to an instruction to increase or decrease its power output level.

As noted above, the load level corresponds to a measure of the actual amount of work being performed by the load at any given instance. In other words, the load level corresponds to the demand of the load as presented to the output of the power supply 104 as a whole. The load level as it "appears" to the slow-response power source 108, as mediated by the power supply 104 and as measured at the output of the slow-response power source 108, may be referred to as the source-experienced demand level of the load 106. In some implementations, the slow-response power source 110 may have the ability to handle source-experienced demand levels within a prescribed range. Outside this range, the slow-response power source 110 may be unsuccessful in servicing the load 106, and it may potentially even enter a failure state.

In one particular implementation, the fast-response power source 110 corresponds to any type of battery or any type of capacitor (such as a super capacitor). A battery or capacitor operates by releasing stored energy, and can therefore more quickly respond to an instruction to increase its power output, compared to a fuel-driven mechanism. For example, a battery or capacitor can respond to an instruction to release additional energy within a small fraction of a second. The fast-response power source 110 can also include other devices that have the capability of quickly storing and releasing energy (compared to the slow-response power source 108), such as a flywheel, an air/gas compressor, etc. In these alternative contexts, the concept of "charging" and "discharging" the fast-response power source 110 broadly represents adding and removing energy from the fast-response power source 110.

More generally, the figures and explanation principally describe the slow-response power source 108 and the fast-respond power source 110 as single respective entities. However, the slow-response power source 108 may be made up of one or more individual slow-response power sources, such as a fuel cell in combination with a generator, etc. Similarly, the fast-response power source 110 may be made up of one or more individual fast-response power sources, such as a battery in combination with a capacitor, etc.

In one implementation, the power supply 104 represents the sole functionality for managing power between the slow-response power source 108 and the load 106. This means, for instance, that neither the slow-response power source 108 nor the load 106 is required to incorporate separate power management functionality, such as a separate battery. Or if either of these components incorporates power management functionality, such functionality may be safely disabled, as it represents redundant functionality. This configuration of components may reduce the loss of power from the slow-response power source 108 to the load 106, and also reduce the points of possible failure in the delivery of power.

In some instances, the power supply 104 is produced as a single unit, e.g., having components enclosed by a single housing. In this case, the power supply 104 may correspond to a unit that is physically separate from the slow-response power source 108 and the load 106 which it services; here, the power supply 104 may be connected to the slow-response power source 108 and the load 106 by respective power cords or the like. In another case, the power supply 104 may be integrated into the functionality provided by the slow-response power source 108 or the load 106. In another implementation, the components of the power supply 104 are distributed among two or more physical units, and any such unit may be separate from the slow-response-power source 108 and the load, or integrated into one of these components.

Figure 6:
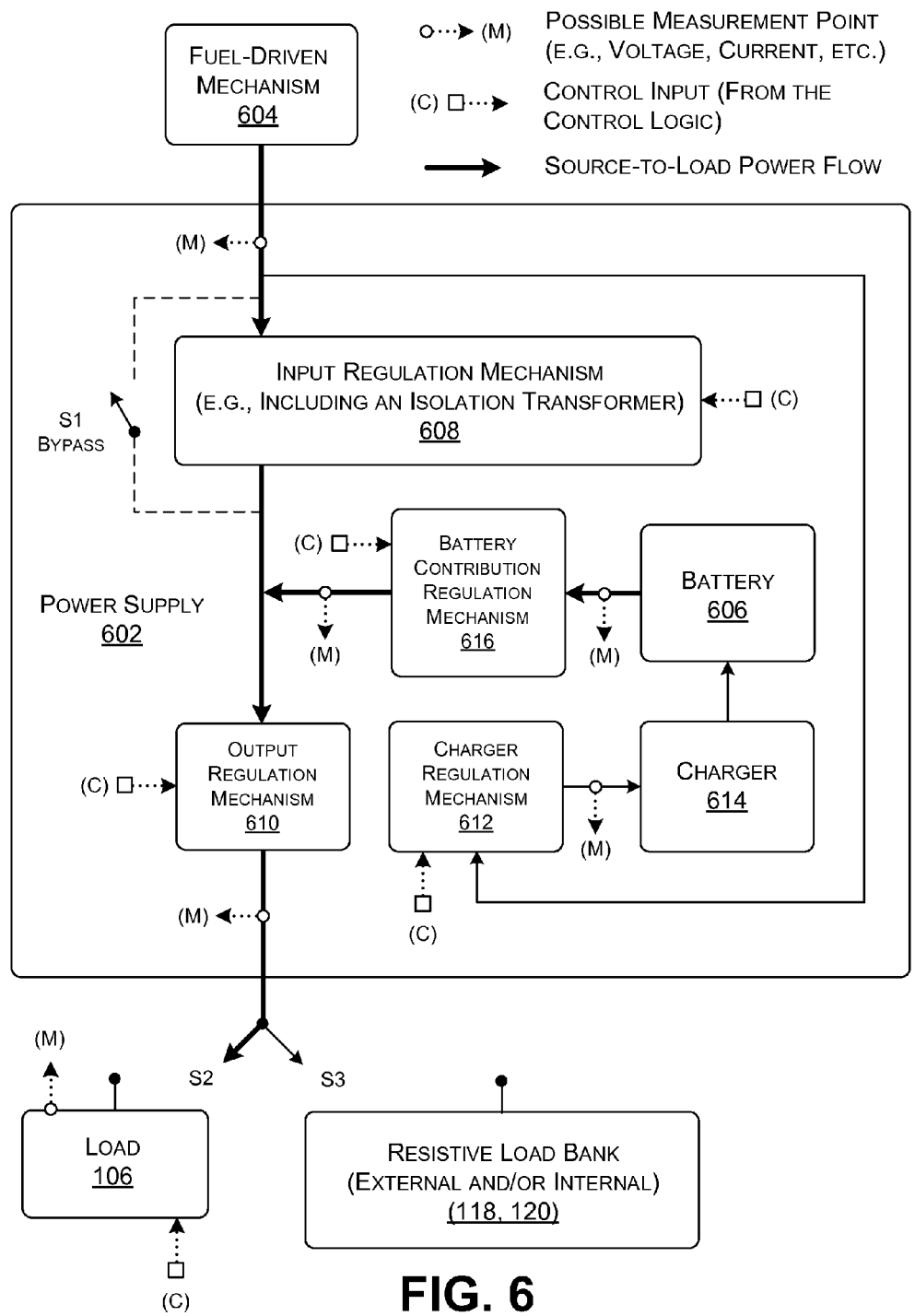
FIG. 6 shows a first non-limiting implementation of the power supply of FIG. 1.
Figure 8:
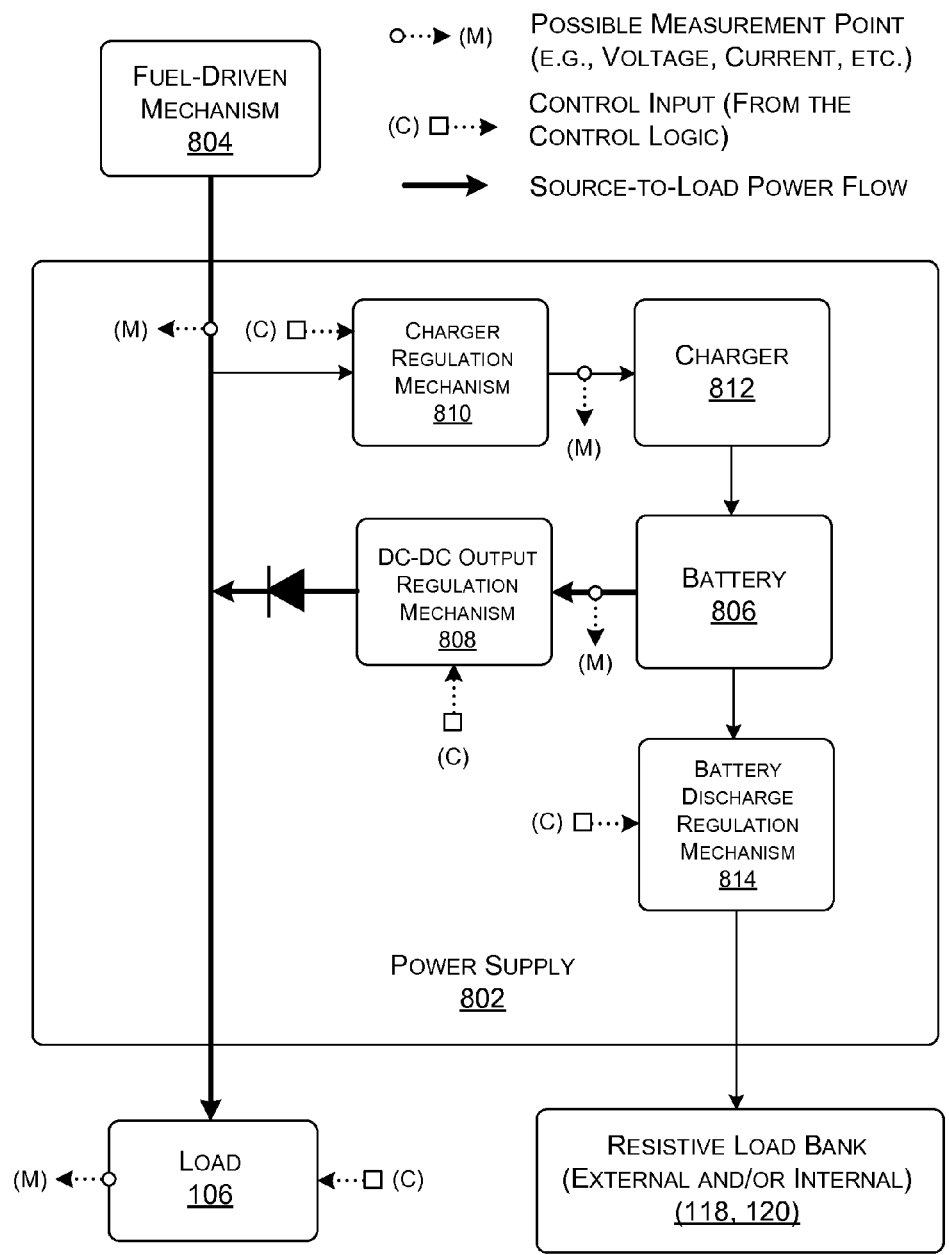
FIG. 8 shows a second non-limiting implementation of the power supply of FIG. 1.

As generally depicted in FIG. 1, the power supply 104 may incorporate a power regulating circuit 114. The power regulating circuit 114 manages the distribution of power within the power supply 104, and the delivery of power to entities outside the power supply 104. For example, the power regulating circuit 114 delivers power to the load 106, selectively drawing from the power supplied by the slow-response power source 108 and/or the fast-response power source 110. For certain conditions, the power regulating circuit 114 also supplies power to a charger 116, which, in turn, charges the fast-response power source 110. For certain conditions, the power regulating circuit 114 also supplies power to a local resistive load bank 118 and/or an external resistive load bank 120. The resistive load banks (118, 120) represent any type of loads that consume power, which are separate from the load 106. FIGS. 6 and 8, to be described below, show two respective non-limiting implementations of the power supply 104, which employ two different respective power regulating circuits.

Control logic 122 controls the operation of the above-described components, including the load 106, the power regulating circuit 114, and the charger 116. The control logic 122 operates by receiving measurement information which represents the state of different components of the environment 102 at a particular point in time. The measurement information may be made up of one or more individual measurements, e.g., corresponding to voltage measurements, current measurements, and/or other kinds of measurements. For instance, one measurement may identify the present voltage level associated with the output of the slow-response power source 108. Another measurement may identify the present charge level of the fast-response power source 110. Another measurement may identify an activity level of a process within the load 106, and so on.

Based on the measurement information, the control logic 122 determines a control action to be taken by the power supply 104, and then produces control output information that expresses the control action. The control output information may be composed of one or more control instructions. The control logic 122 then forwards the control instructions to appropriate respective components within the environment 102.

For example, some control instructions may control the behavior of the power regulating circuit 114, e.g., by specifying the flow of power within the power supply 104 and the flow of power to entities that are external to the power supply 104 (such as the load 106 and the resistive load banks (118, 120)). Other control instructions may instruct the load 106 to initiate or modify power-consuming processes (for the purpose of consuming additional energy) and/or to terminate or modify non-critical power-consuming processes (for the purpose of consuming less energy), and so on. FIG. 1 generically represents processes associated with the load 106 as "Process A," "Process B," etc. In the case that the load 106 represents one or more computing devices, some processes may correspond to hardware-related activities performed by the load 106, such as the running of fans. Other processes may correspond to the execution of machine-readable instructions by the load 106, such as the running of specified programs.

More specifically, consider three states associated with different respective load behaviors. In a first state, the load level of the load changes at a rate (if it changes at all) which can be effectively handled by the slow-response power source 108 alone, without the use of the fast-response power source 110. Here, the control logic 122 instructs the power supply 104 to primarily use the slow-response power source 108 to provide power to the load 106. The control logic 122 may also use this state as an opportunity to charge or discharge the fast-response power source 110 until it reaches a specified charge level (to be described below in connection with FIG. 4).

In a second state, the load level of the load 106 increases at a rate that is too high for the slow-response power source 108 to effectively handle by itself without amelioration, e.g., because of the above-described inherent mechanical limitations of the slow-response power source 108. In this case, the control logic 122 may instruct the power supply 104 to use the fast-response power source 110 to assist the slow-response power source 108 in providing power to the load 106. Alternatively, or in addition, the control logic 122 may instruct the load 106 to temporarily modify or terminate load processes, such as by slowing down (or shutting off) a fan, by delaying or slowing down (or otherwise reducing the performance of) the execution of a specified program, etc.

In a third state, the load level of the load 106 decreases at a rate that is too high for the slow-response power source 108 to handle by itself without amelioration, e.g., again due to the inherent mechanical limitations of the slow-response power source 108. The control logic 122 may address this case by instructing the charger 116 to charge the fast-response power source 110 to a specified level. Alternatively, or in addition, the control logic 122 may instruct the power supply 104 to discharge excess energy into the local and/or external resistive load bank (118, 120). Alternatively, or in addition, the control logic 122 may instruct the load 106 to commence one or more energy-consuming processes, such as the running of a fan, or the execution of a program. Alternatively, or in addition, the control logic 122 may instruct the load 106 to increase the energy expenditure associated with one or more existing processes, and so on. The resistive load banks (118, 120) and the processes are generically referred to herein as power sinks because they serve as a destination to which power may be delivered to consume excess energy.

Figure 2:
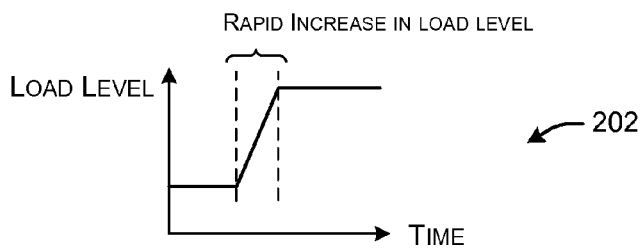
FIG. 2 shows graphs which summarize one manner in which the power supply (of FIG. 1) may respond to a rapid increase in the load level presented by the load.
Figure 2:
Figure 2:
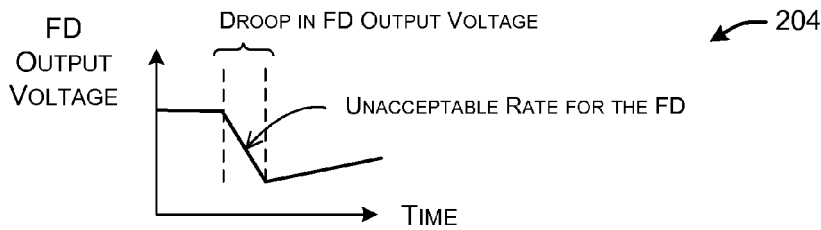
Figure 2:
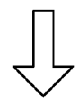
Figure 2:
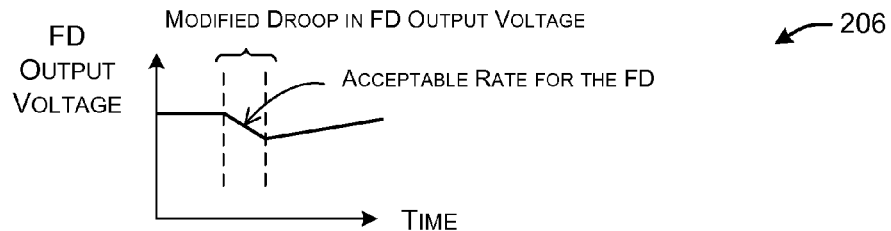

FIG. 2 illustrates the response of the control logic 122 to the above-described second state. More specifically, a graph 202 shows an abrupt increase in the load level of the load 106, e.g., corresponding to a rapid increase in the amount of work performed by the load 106. A graph 204 shows one possible effect of the load behavior shown in the graph 202, namely a rapid drop in voltage level at the output of the slow-response power source 108. More specifically, for instructional purposes, the graph 204 shows the effect that would occur without the ameliorative power correction operation performed by the power supply 104 (but which does not actually occur due to the power correction). In other words, the graph 204 reflects the load level of the load 106, as it would be experienced by the slow-response power source 108, referred to herein as the source-experienced demand level.

In response to the increase in load level, the control logic 122 may instruct the power regulating circuit 114 to draw power from the fast-response power source 110, to thereby assist the slow-response power source 108 in providing power to the load 106. Alternatively, or in addition, the control logic 122 may instruct the load 106 to modify or terminate non-critical processes. A graph 206 shows how the above-described ameliorating effects serve to lessen the impact of the increase in load level. That is, the graph 206 shows that the dip in the voltage level at the output of the slow-response power source 108 is reduced to a rate that the slow-response power source 108 can effectively tolerate, compared to the rate shown in the graph 204. In other words, the amelioration reduces the rate of change in the source-experienced demand level to within an acceptable range for the slow-response power source 108, allowing the slow-response power source 108 to successfully service the load 106.

Figure 3:
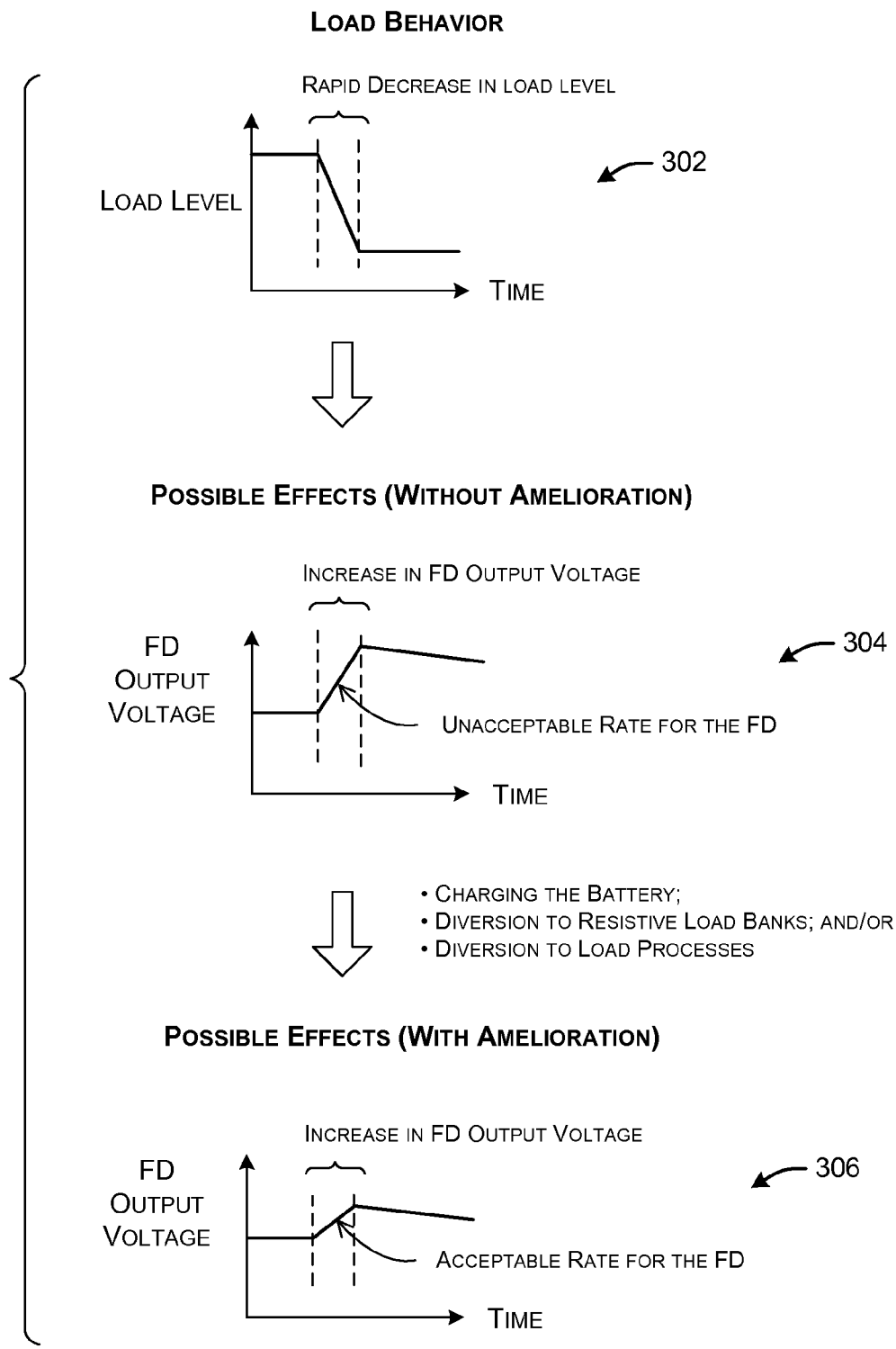
FIG. 3 shows graphs which summarize one manner in which the power supply (of FIG. 1) may respond to a rapid decrease in the load level presented by the load.

FIG. 3 illustrates the response of the control logic 122 to the above-described third state. More specifically, a graph 302 shows an abrupt decrease in the load level of the load 106, e.g., corresponding to a rapid decrease in the amount of work performed by the load 106. A graph 304 shows one possible effect of the load behavior shown in the graph 302, corresponding to increase in voltage level at the output of the slow-response power source 108. That is, for instructional purposes, the graph 304 shows the effect of the load behavior (shown in the graph 302) that would occur without the power correction operation performed by the power supply 104 (but which does not actually occur due to the power correction). In other words, the graph 304 reflects the load level of the load 106, as it would be experienced by the slow-response power source 108 (i.e., the source-experienced demand level).

In response to the decrease in load level, the control logic 122 may instruct the power regulating circuit 114 to charge the fast-response power source 110, and/or discharge energy into the local and/or external resistive load banks (118, 120), and/or initiate or modify one or more energy-consuming processes in the load 106. A graph 306 shows how the above-described ameliorating effects serve to lessen the impact of the decrease in load level. That is, the graph 306 shows that the increase in the voltage level at the output of the slow-response power source 108 is reduced to a rate that the slow-response power source 108 can effectively tolerate, compared to the rate shown in the graph 204. In other words, the amelioration reduces the rate of change in the source-experienced demand level to within an acceptable range for the slow-response power source 108, allowing the slow-response power source 108 to successfully service the load 106.

More generally stated, the power supply 104 operates by using the slow-response power source 108 to follow the general or average trend in the load's power requirements, e.g., by increasing or decreasing power to the load 106 to meet the general trend. The power supply 104 can use the fast-response power source 110 and other power management provisions to address abrupt deviations from the general power trend. In other words, the power supply 104 uses the slow-response power source 108 to address the "low frequency" component of the load's power requirement, and uses the fast-response power source 110 and other power management provisions to address the "high frequency" component of the load's power requirement.

Figure 4:
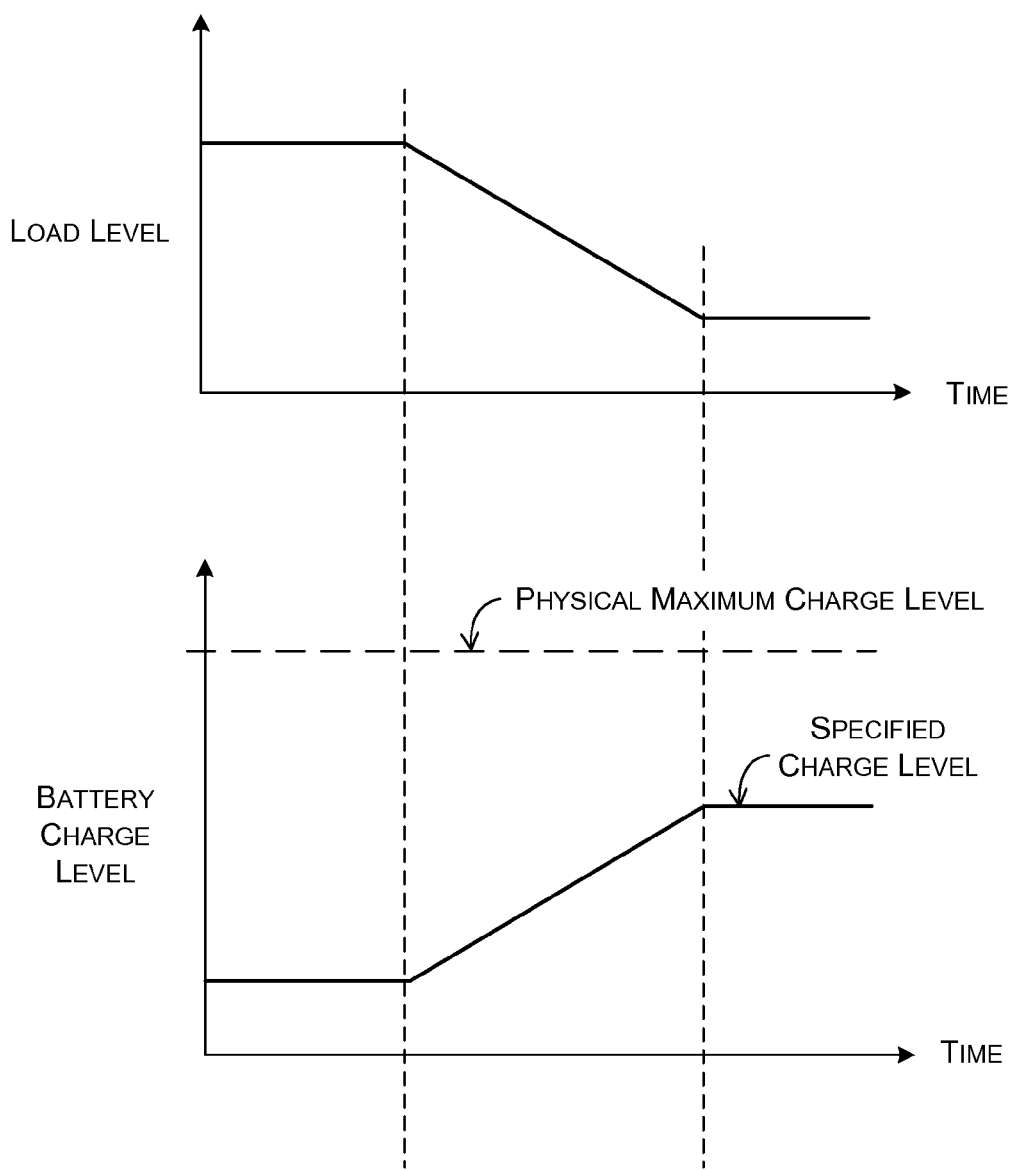
FIG. 4 shows graphs which summarize one manner in which the power supply (of FIG. 1) may charge its battery to a specified level, so as to most appropriately address subsequent possible load change events.

FIG. 4 shows one manner by which the control logic 122 may control the charger 116 to charge the fast-response power source 110 (such as a battery). In one implementation, the fast-response power source 110 is capable of being charged to a physical maximum charge level, e.g., corresponding to its maximum charge capacity. However, in the above-described first state (in which the load is not rapidly increasing or decreasing), the control logic 122 is configured to use the charger 116 to charge the fast-response power source 110 to a specified charge level that is less than the physical maximum charge level. For example, in one implementation, the specified charge level is a prescribed percentage of the physical maximum charge level, such as 50%, or 70%, etc.

By virtue of the above-described charging approach, the fast-response power source 110 is capable of temporarily storing additional energy when the power supply 104 enters the third state, associated with a rapid decrease in the load and a consequent rise in the output voltage associated with the slow-response power source 108. Once the load has stabilized, the control logic 122 may instruct the fast-response power source 110 to again reduce its charge level back down to the specified charge level.

In another implementation, the specified charge level that is maintained in the first state inversely varies with the load level of the load 106. For example, as shown in FIG. 4, at times of relatively high load levels, the specified target charge level is relatively low. In contrast, at times of relatively low load levels, the specified target charge level is comparatively higher. By maintaining a low charge level at times of high load utilization, the power supply 104 is able to most effectively address a subsequent rapid decrease in load level, should that occur, e.g., by temporarily absorbing the excess energy that is produced in this rapid decrease. The power supply 104 will not be called on to address a rapid and prolonged increase in the load level in this situation, assuming that the present load level is already relatively high (based on the premise that the load level can only rise so high).

Similarly, by maintaining a high charge level at times of low load utilization, the power supply 104 is able to most effectively address a subsequent rapid increase in load level, should that occur, e.g., by temporarily supplying additional energy to the load 106 to help out the slow-response power source 108. The power supply 104 will not be called on to address a rapid and prolonged decrease in the load level in this situation, assuming that the present load level is already relatively low (based on the premise that the load level can only decrease so low).

In summary, the control logic 122 can charge the fast-response power source 110 to a variable specified charge level that will be most useful to address subsequent possible events associated with changes in load level.

Figure 5:
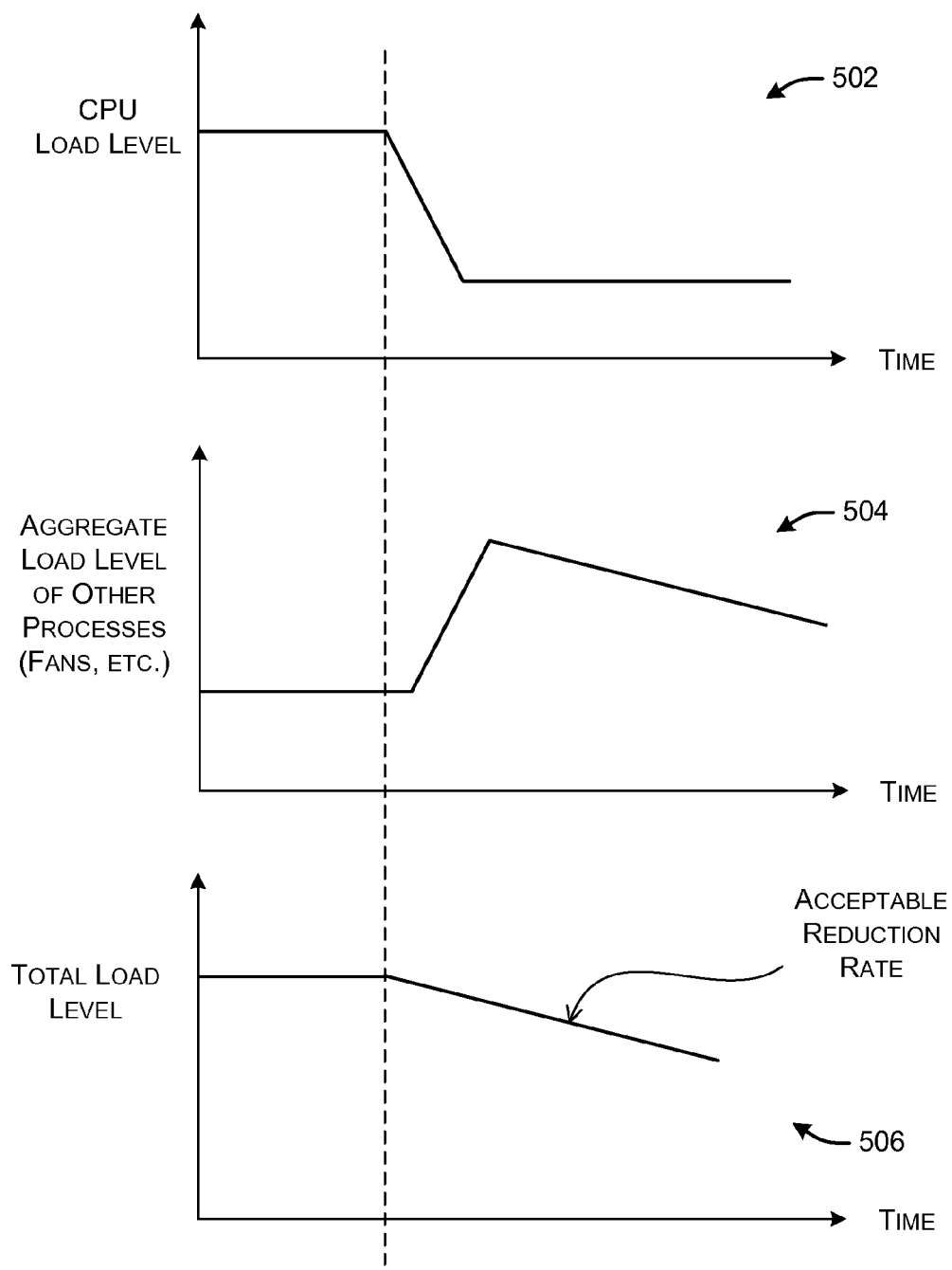
FIG. 5 shows graphs which summarize one manner in which the power supply (of FIG. 1) may divert excess energy to processes associated with the load, to thereby reduce the rate at which the overall load level of the load decreases.

FIG. 5 shows a series of graphs which summarize one manner in which the power supply 104 may divert excess energy to energy-consuming processes associated with the load 106, to thereby reduce the rate at which the load level of the overall load 106 decreases. Assume, in this specific example, that the load 106 corresponds to at least one computing device that uses at least one central processing unit (CPU) to execute machine-readable instructions. Further assume that the amount of work that the CPU is performing at any given time is measured by the CPU load level, and that the CPU load level is one component of the overall load level exhibited by the load 106 at any given time.

As indicated in graph 502, assume that the CPU load level decreases at a dramatic rate, too great for the slow-response power source 108 to handle by itself. Recall from FIG. 3 that this event will cause the output voltage of the slow-response power source 108 to increase. To address this excess energy, the control logic 122 may send a control signal to the load 106, which instructs the load 106 to run one or more energy-consuming processes. A graph 504 illustrates the aggregate load level associated with these energy-consuming processes.

For example, the control logic 122 may instruct the load 106 to run physical peripheral mechanisms at maximum or high-value settings, such as by running fans at maximum or high speed. In addition, or alternatively, the control logic 122 may instruct the load 106 to run meaningful program operations, such as by initiating one or more jobs that were originally scheduled to be performed at a later time. In addition, or alternatively, the control logic 122 can instruct the load 106 to run "empty" processing tasks that may serve no useful purpose (but which nonetheless accomplish the objective of consuming energy), such as by performing a meaningless series of operations in a do-loop. In additional, or alternatively, the control logic 122 can instruct the load 106 to increase the energy at which it runs existing or new processes. For example, the control logic 122 can instruct the load 106 to use additional resources in performing a process, such as additional memory resources, computational resources, etc. In addition, or alternatively, the control logic 122 can instruct the load 106 to dynamically modify one or more operating parameters that affect the operation of any load component(s), such as voltage level, frequency level, etc., so that the load component(s) consume additional energy. Still other types of processes may be invoked (and/or modified) in the load 106 to consume energy; the above examples are cited by way of example, not limitation.

A graph 506 shows the total load level associated with the load 106, which corresponds to a combination of the CPU load level (represented in the graph 502) and the aggregate load level associated with the energy-consuming processes (represented in the graph 504). By virtue of the invocation of the energy-consuming processes, the total load level decreases at a rate that the slow-response power source 108 can effectively handle.

Although not shown, the control logic 122 can also instruct existing processes to terminate, or modify their respective activity levels, so that the load 106, overall, places fewer demands on the slow-response power source 108. The control logic 122 may perform this operation to reduce an overall rate of increase in the load level of the load 106. This power management strategy can be visualized by flipping each of the graphs 502, 504, and 506 shown in FIG. 5, e.g., such that the CPU load level will be shown as rapidly increasing, rather than rapidly decreasing, the load level of the other processes will be shown as decreasing, rather than increasing, etc.

The control logic 122 can decrease energy in the load 106 using any of the techniques described above, but in reverse. For example, the control logic 122 may instruct the load 106 to run physical peripheral mechanisms at minimum or low-value settings. In addition, or alternatively, the control logic 122 may instruct the load 106 to delay or suspend program operations. In additional, or alternatively, the control logic 122 can instruct the load 106 to decrease the energy at which it runs processes. For example, the control logic 122 can instruct the load 106 to use fewer resources in performing a process, such as fewer memory resources, computational resources, etc. In addition, or alternatively, the control logic 122 can instruct the load 106 to dynamically modify one or more operating parameters that affect the operation of any load component(s), such as voltage level, frequency level, etc., so that the load component(s) consume less energy. Still other types of actions can be taken to reduce the energy expenditure of the load 106; the above examples are cited by way of example, not limitation.

FIG. 6 shows a power supply 602 which represents one particular implementation of the power supply 104 of FIG. 1. In this figure, the notation "→(M)," at a particular point in the power supply 602, represents a possible measurement that can be made at that point, and which represents the state of that point at the present time. For example, the measurement may correspond to a voltage measurement, a current measurement, and/or some other energy-related measurement. The notation "(C)→," which feeds into a particular component, represents a possible coupling between the control logic 122 and that particular component. The control logic 122 can control the component by sending a control instruction via such a control coupling. Finally, the bolded arrows represent the flow of power from the power sources to the load 106. Here, the power sources are specially identified as being a fuel-driven mechanism 604 and a battery 606, but the power supply 602 may work in conjunction with any slow-response power source and any fast-response power source.

The power supply 602 may optionally include any type of input regulation mechanism 608, such as an isolation transformer. In one implementation, the input regulation mechanism 608 may accept an input DC voltage provided by the fuel-driven mechanism 604. Based on a control instruction from the control logic 122, the input regulation mechanism 608 may convert the input DC voltage into an output DC voltage, e.g., by decreasing the voltage level of the input DC voltage. In doing so, the input regulation mechanism 608 may optionally convert the input DC voltage into an AC voltage signal, and then convert the AC voltage signal back into a DC voltage.

The control logic 122 may also optionally control the amount of power, originating from the fuel-driven mechanism 604, that passes through the input regulation mechanism 608. For example, the input regulation mechanism 608 may incorporate a switch mechanism associated with the primary winding of its isolation transformer. The control logic 122 can pulse the switch mechanism at a prescribed duty cycle to produce an AC signal and to control the amount of power, originating from the fuel-driven mechanism 604, that passes through the input regulation mechanism 608.

The power supply 602 may also include a switch S1 that, when closed, serves as a bypass of the input regulation mechanism 608. As will be described below, the control logic 122 may close the switch S1 when the power supply 104 is operating within a prescribed bypass zone; in that zone, transformation of the input voltage from the fuel-driven mechanism 604 is not required and is therefore avoided so as to reduce the loss of power. The control logic 122 controls the state of the switch S1.

The input regulation mechanism 608 may also include an output regulation mechanism 610. The output of the input regulation mechanism 608 is coupled to the input of the output regulation mechanism 610. The output regulation mechanism 608, in turn, has an output which is coupled to the load 106, and/or to the local resistive load bank 118 and/or the external resistive load bank 120. That is, when a switch S2 is closed, the power supply 602 delivers power to the load 106. When a switch S3 is closed, the power supply 602 delivers power to the local resistive load bank 118 and/or the external resistive load bank 120. The control logic 122 controls the states of the switches (S2, S3). The output regulation mechanism 608 may correspond to, for example, a DC voltage regulator which converts an input DC voltage level to an appropriate output voltage level for use in powering the load 106.

The power supply 602 also includes a charger regulation mechanism 612 for controlling the extent of charging performed by a charger 614. The charger 614, in turn, charges the battery 606. The power supply 602 also includes a battery contribution regulation mechanism 616 that controls the extent to which power from the battery 606 contributes to the aggregate power that is delivered to the load 106 (and/or to the resistive load bank(s) (118, 120)). In one implementation, the charger regulation mechanism 612 may incorporate a switch mechanism. The control logic 122 can pulse the switch mechanism at a prescribed duty cycle to control the amount of power, originating from the fuel-driven mechanism 604, that is fed to the battery 606, for the purpose of charging the battery. Similarly, the battery contribution regulation mechanism 616 can be implemented as a switch mechanism that can be pulsed at a prescribed duty cycle to control the amount of energy that flows from the battery 606 into the load 106.

Hence, overall, the control logic 122 can control the mix of power that is fed to the load 106 by sending appropriate control instructions to the input regulation mechanism 608 and the battery contribution regulation mechanism 616. That is, a control instruction fed to the input regulation mechanism 608 controls the amount of power that is supplied from the fuel-driven mechanism 606, while a control instruction fed to the battery contribution regulation mechanism 616 controls the amount of power that is supplied from the battery 606. More specifically, the control logic 122 can control the specified regulation mechanisms such that the rate at which the load 106 increases or decreases, as experienced by the fuel-driven mechanism 604, is maintained within a range of rates that the fuel-driven mechanism 604 can safely handle (to be described below in greater detail with reference to FIG. 7).

In the particular case of FIG. 6, the energy from the battery 606 combines with the energy from the fuel-driven mechanism 604 at a point between the input regulation mechanism 608 and the output regulation mechanism 610. This configuration is cited by way of illustration, not limitation; other implementations can combine power from the battery 606 with power from the fuel-driven mechanism 604 at different junctures in the power regulating circuit. Further, the charger 614 can alternatively draw power from the output of the output regulation mechanism 610, rather than the output of the fuel-driven mechanism 604.

Figure 7:
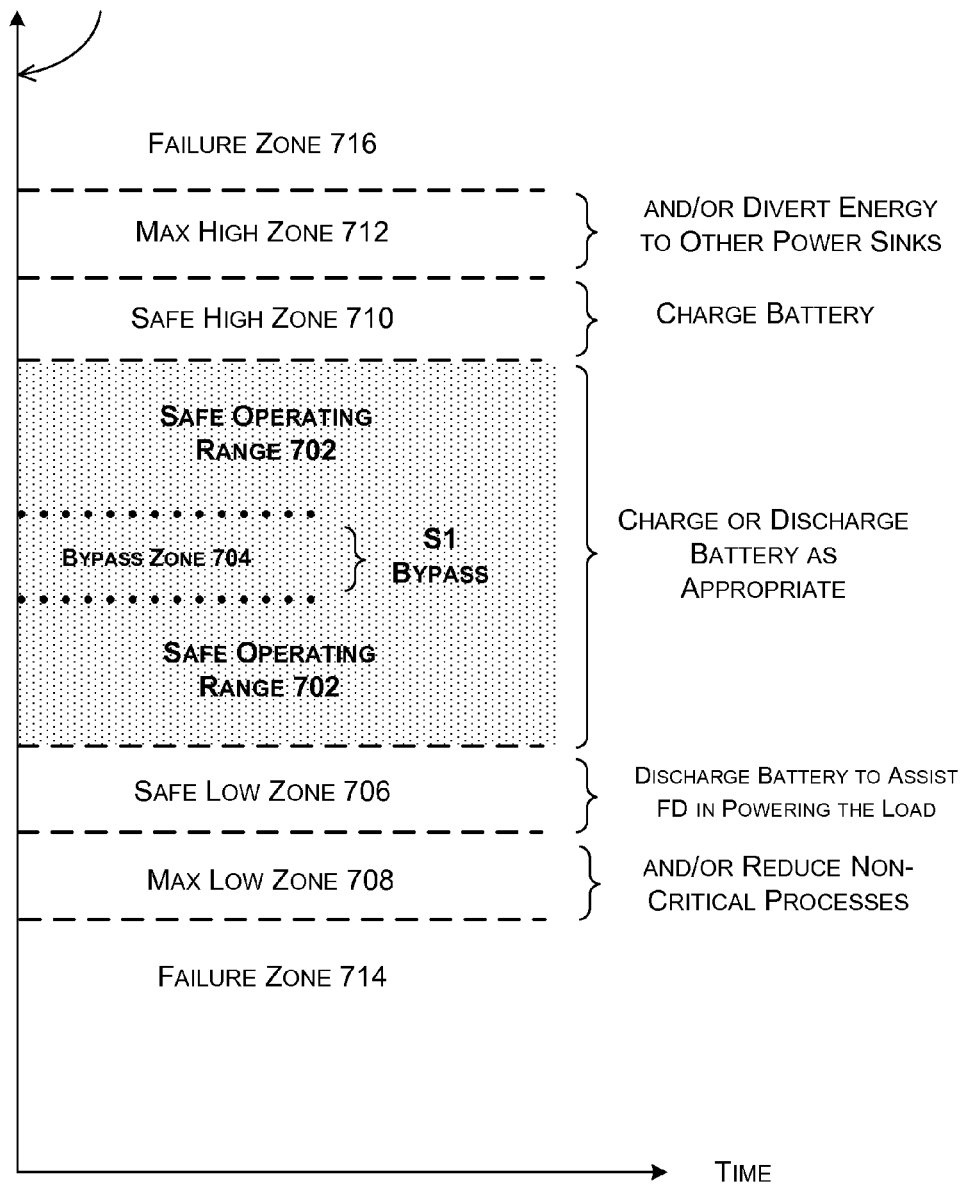
FIG. 7 is a diagram which summarizes different zones of operation associated with the power supply of FIG. 6, and the control actions that are performed by the power supply when it is operating within those zones.

FIG. 7 shows different zones in which the power supply 602 (of FIG. 6) may operate. Each zone is associated with a particular load behavior, which is associated, in turn, with a particular manner in which the load level of the load 106 is changing (if at all). One or more measurement values can be used to describe the load behavior. For example, one or more measurement values may represent the load level as it is presented to the output of the power supply 602 as a whole. One or more other measurement values may represent the load level as it is specifically experienced by the fuel-driven mechanism 604, such as, but not limited to, the voltage value at the output of the fuel-driven mechanism 604. Hence, each zone is also represented by a range or set of characteristic measurement values.

In a safe operating zone 702, the load level is constant, or slowly increasing, or slowly decreasing. In this region, the fuel-driven mechanism 604 can handle the load 106 by itself, and may therefore serve as the primary power source for the load 106. Within this zone, the control logic 122 may also charge or discharge the battery to a specified charge level, as explained above with reference to FIG. 4. For example, if the power supply 602 has just finished handling a rapid increase in load level, the control logic 122 may add energy to the battery 606 to replenish it to the specified charge level. But if the power supply 602 has just finished handling a rapid decrease in load level, the control logic 122 may discharge any excess energy that has been stored in the battery 606, e.g., by passing it to the local resistive load bank 118 and/or the external resistive load bank 120, etc.

A bypass zone 704 lies within the safe operating zone 702. In the bypass zone 704, the power supply 602 may close the switch S1. As a result, the power from the fuel-driven mechanism 604 bypasses the input regulation mechanism 608 (e.g., the isolation transformer). That is, the power signal may be allowed to bypass the input regulation mechanism 608 because it is already within a desired voltage range.

In a safe low zone 706, the load decreases at a rate that the fuel-driven mechanism 604 cannot readily handle by itself without the ameliorative effects of the power supply 602. To address this condition, the control logic 122 may use power from the battery 606 to assist the fuel-driven mechanism 604 in powering the load 106, that is, by discharging the battery energy into the load 106. The battery contribution regulation mechanism 616 controls the extent to which power from the battery 606 contributes to the overall power that is supplied to the load 106. If the battery 606 becomes depleted, the control logic 122 may optionally send control instructions to the load 106 to terminate or modify load processes.

In a max low zone 708, the load decreases at a yet steeper rate compared to the safe low zone 706. To address this condition, the control logic 122 can continue to instruct the power supply 603 to discharge the battery 606 into the load 106. Simultaneously therewith, the control logic 122 can instruct the load 106 to terminate or modify load processes.

In a safe high zone 710, the control logic 122 may instruct the charger 614 to charge the battery. Once the battery 606 reaches its maximum capacity (or a specified charge that is less than its maximum capacity), the control logic 122 may instruct the power supply 602 to divert energy to the local and/or external resistive load banks (118, 120), and/or invoke and/or modify one or more power-consuming processes in the load 106.

In a max high zone 712, the control logic 122 may instruct the power supply 602 to perform the same activities described above, but in a more aggressive manner compared to the safe high zone 710. For example, the control logic 122 can instruct the charger 614 to charge the battery 606 while also instructing the power supply 602 to divert energy to other power sinks.

A low failure zone 714 and a high failure zone 716 correspond to two zones in which the demand changes so quickly that the power supply 602 cannot successfully counter it using the ameliorative techniques described above. In these zones, a failure switch may optionally be triggered to cause the power supply 602 to shut down to avoid potential damage to the power supply 602.

FIG. 8 shows a power supply 802 which represents another particular implementation of the power supply 104 of FIG. 1. Again, the notation "←(M)" represents a possible measurement point, while the notation "(C)→" represents a possible control input. The bolded arrows represent the flow of power from the power sources to the load 106. Here, the power sources include a fuel-driven mechanism 804 and a battery 806, but the power supply 802 may work in conjunction with any slow-response power source and any fast-response power source. In this case, assume that the fuel-driven mechanism 804 supplies output voltages within a range that is narrower than the fuel-driven mechanism 604 of FIG. 6, enabling the power supply 802 to eliminate the use of the input regulation mechanism 608.

The power supply 802 may include a DC-DC regulation mechanism 808, which converts an input DC voltage level, provided by the battery 806, to a desired output voltage level. The power supply 802 also includes a charger regulation mechanism 810 for controlling the amount of energy that is supplied to a charger 812, for use in charging the battery 806. The power supply 802 also includes a battery discharge regulation mechanism 814 for controlling the extent to which the battery 806 discharges energy into the local and/or external resistive load banks (118, 120) and/or to other power sinks (not shown). The charger regulation mechanism 810 and the battery discharge regulation mechanism 814 can be implemented as switch mechanisms in the manner described above. That is, the control logic 122 may pulse the switch mechanism provided by the charger regulation mechanism 810 at a prescribed duty cycle to control the quantity of power (received from the fuel-driven mechanism 804) that is used to charge the battery 806. The control logic 122 may pulse the switch mechanism provided by the battery discharge regulation mechanism 814 at a prescribed duty cycle to control the amount of energy that flows from the battery 806 into the local and/or external resistive load banks (118, 120). More specifically, the control logic 122 can control the specified regulation mechanisms such that the rate at which the load 106 increases or decreases, as experienced by the fuel-driven mechanism 804, is maintained within a range of rates that the fuel-driven mechanism 804 can safely handle.

More specifically, the power supply 802 operates in a similar manner to that described above with reference to FIGS. 1 and 6. That is, in a first state (for slowly changing load levels), the control logic 122 can instruct the power supply 802 to use the fuel-driven mechanism 804 as the primary source of power to the load 106. In this state, the control logic 122 may also instruct the power supply 802 to charge or discharge the battery 806 to a specified charge level.

In the second state (for quickly increasing load levels), the control logic 122 can instruct the power supply 802 to use energy from the battery 806 to address any voltage droop in the output of the fuel-driven mechanism 804. If battery 806 becomes depleted, or if the rate of load level increase is particularly high, the control logic 122 can also instruct the load 106 to terminate or modify load processes.

In the third state (for quickly decreasing load levels), the control logic 122 can instruct the power supply 802 to charge the battery 806. If the battery charge level 814 reaches full capacity or a specified charge level, or if the rate of load level decrease is particularly steep, the control logic 122 may instruct the power supply 802 to discharge energy into any power sink(s), such as the local and/or external resistive load banks (118, 120).

Note that, in the case of FIG. 8, the fuel-driven mechanism 804 is directly coupled to the load 106 via a power delivery bus. That is, the components of the power supply 802 are coupled to the bus, but in a parallel relationship, not a series (inline) relationship. In operation, the power supply 802 of FIG. 8 may inject or remove power into/from the power delivery bus during those times when the fuel-driven mechanism 804 cannot satisfactorily service the load 106. At other times, the components of the power supply 802 operate in a low-power standby mode, without affecting the amount of power that is delivered to the load 106.

Consider the efficiency of the power supply 802 in relation to a power supply, such as the power supply 602 of FIG. 6, which uses power regulating components within its power delivery path. Such a power supply is referred to herein as an "inline regulation power supply." More specifically, an inline regulation power supply may receive power from one or more power sources, where that power may potentially exhibit widely varying voltage levels. The inline regulation power supply uses one or more inline power regulating components to transform the input power into a signal having an acceptable voltage range, for use in powering a load. One potential drawback of this configuration is that the inline power regulation components inherently leak power, even in the normal range when the components are not modifying the voltage level(s) of their input signal(s). In contrast, the power supply 802 (of FIG. 8) can forgo the above-described loss of power because it does not place any inline power regulation components in the power delivery path. More specifically, the power supply 802 does engage its power regulation components in those circumstances when power correction is needed, resulting in some loss of power in the process; but as a whole, the power supply 802 may predominately operate in a normal range, in which the power correction is not invoked, and the associated leakage of power is hence not incurred.

As a closing point in this section, the power supply 104 described above (and shown in FIG. 1) performs its functions in a principally reactive manner, e.g., in response to actual changes in the load level of the load 106. In addition, or alternatively, the power supply 104 can include, or otherwise have access to, a prediction module 124. The prediction module 124 can predict the future load level of the load 106 based on prediction input information, to generate prediction output information. The prediction output information constitutes another part of the input information that is fed to the control logic 122. The control logic 122 generates the control output information based on the measurement information and/or the prediction output information. As before, the control output information controls the behavior of the power supply 104, including the charge level of the fast-response power source 110.

The prediction input information may constitute any information that may have a bearing on the future load level of the load 106. For example, the prediction input information may include upcoming work information which reflects the amount of work that the load 106 is scheduled to perform. In addition or alternatively, the prediction input information may include temporal information, such as time-of-date information, calendar information, etc. In addition or alternatively, the prediction input information may include event information, which reflects the occurrence of particular events which may affect the load level. In addition or alternatively, the prediction input information may include the above-described measurement information itself, which may reveal trends in the load level, etc. The above-described instances of prediction input information are cited by way of example, not limitation; still other types of input information may have a bearing on the anticipated load level of the load 106.

The prediction module 124 can use any logic to generate the prediction output information. For example, the prediction module 124 can apply any environment-specific equation, lookup table, algorithm, etc. which maps the prediction input information to an anticipated change in load level. Alternatively or in addition, the prediction module 124 may use a machine-trained model to map the prediction input information to the prediction output information. Such a model can be produced, using any machine-learning technique, based on a corpus of training data; the training data describes historical changes in load level and the factors which accompanied these changes.

The control logic 122 can control the power supply 104 based on the prediction output information, so as to effectively address load change events. For example, assume that the prediction module 124 produces prediction output information which predicts an abrupt increase in the load level, where that change is too large for the slow-response power source 108 to handle by itself. In response, the control logic 122 can increase the charge level of the fast-response power source 110, in advance of the load-changing event. This operation will enable the power supply 104 to more effectively handle the expected increase in load level, e.g., by supplying supplemental energy from the slow-response power source 108 to power the load 106. In another case, assume that the prediction module 124 predicts an abrupt decrease in the load level, where that change is again too large for the slow-response power source 108 to handle by itself. In response, the control logic 122 can anticipatorily discharge energy from the fast-response power source 110 in any manner explained above. This operation will enable the power supply 104 to more effectively handle the expected decrease in load level, e.g., by readying the fast-response power source 110 to receive excess energy from the slow-response power source 108.

Examples of predictable increases in load level may correspond to the scheduled activation of a server, the onset of an expected peak traffic period, the onset of a scheduled work item, etc. Examples of predictable decreases in load level may correspond to the scheduled deactivation of a server, the onset of an expected traffic lull, the completion of a scheduled work item, etc. In some cases, the prediction module 124 can predict a load-changing event before it occurs. In other cases, the prediction module 104 can predict the course of a load-changing event that has already started, e.g., by predicting its continuance.

B. Illustrative Processes

Figure 9:
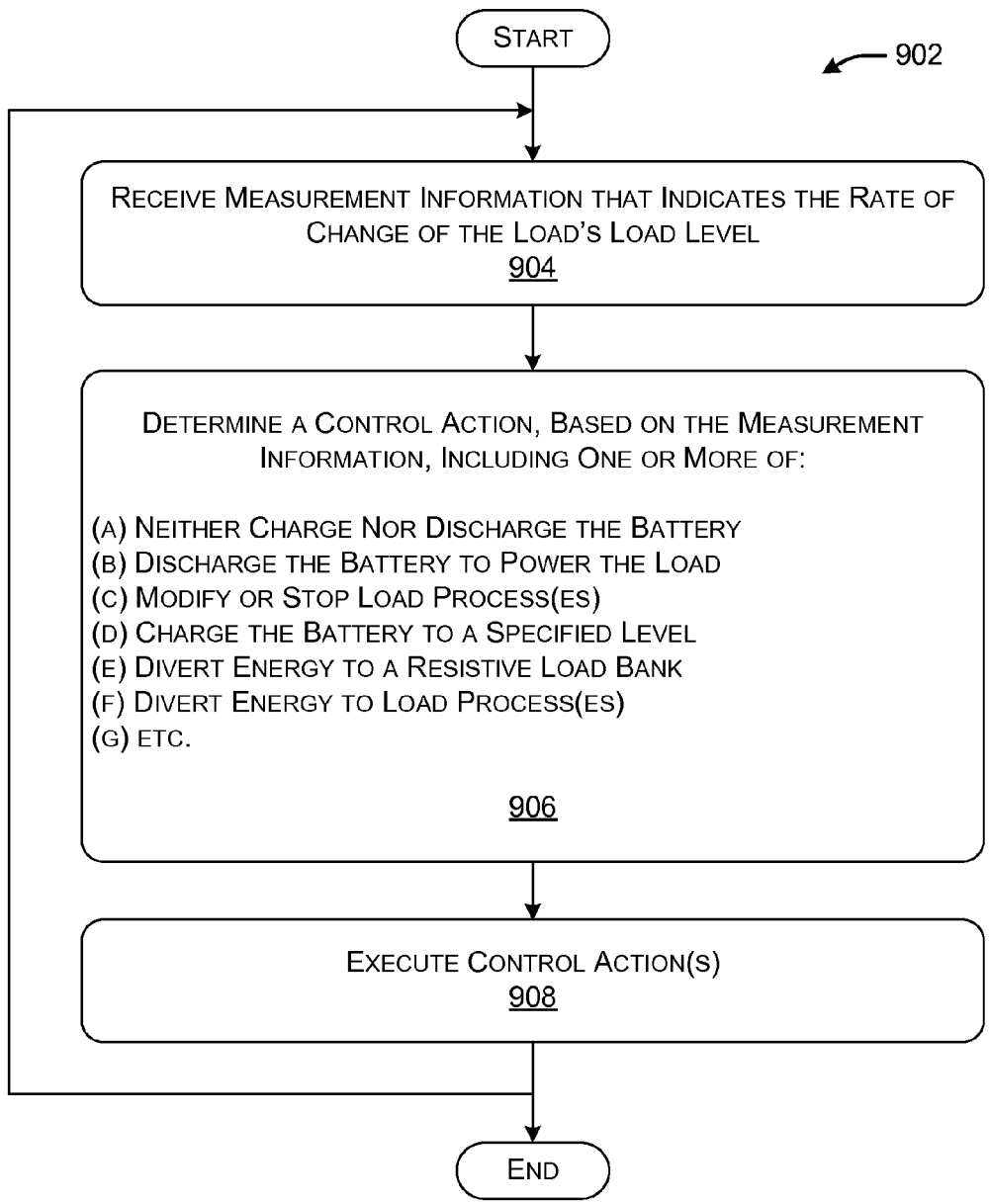
FIG. 9 shows a process which presents an overview of one manner of operation of the power supply of FIG. 1.
Figure 10:
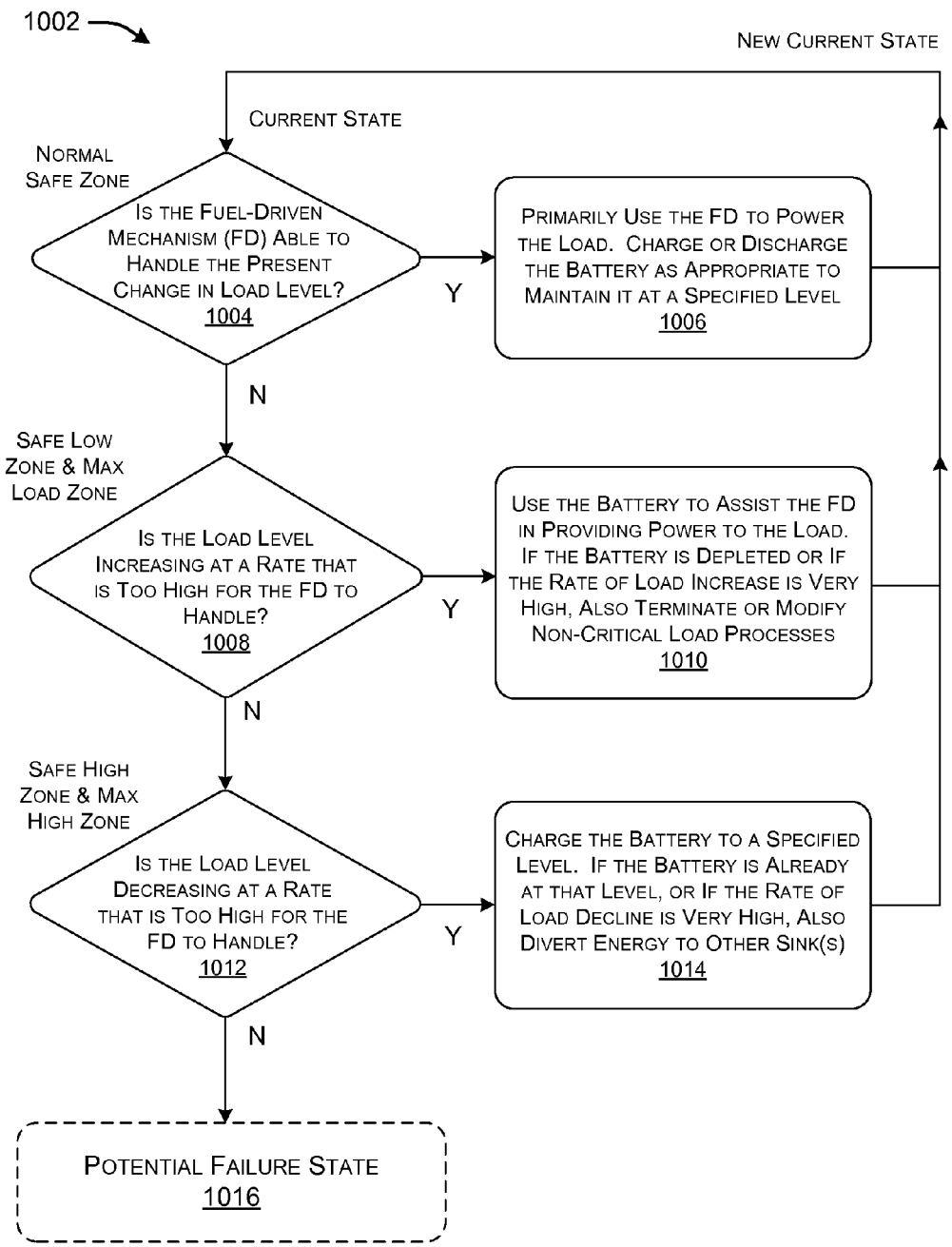
FIG. 10 shows a process which describes one manner of controlling the power supply (of FIG. 1) for different load states.
Figure 11:
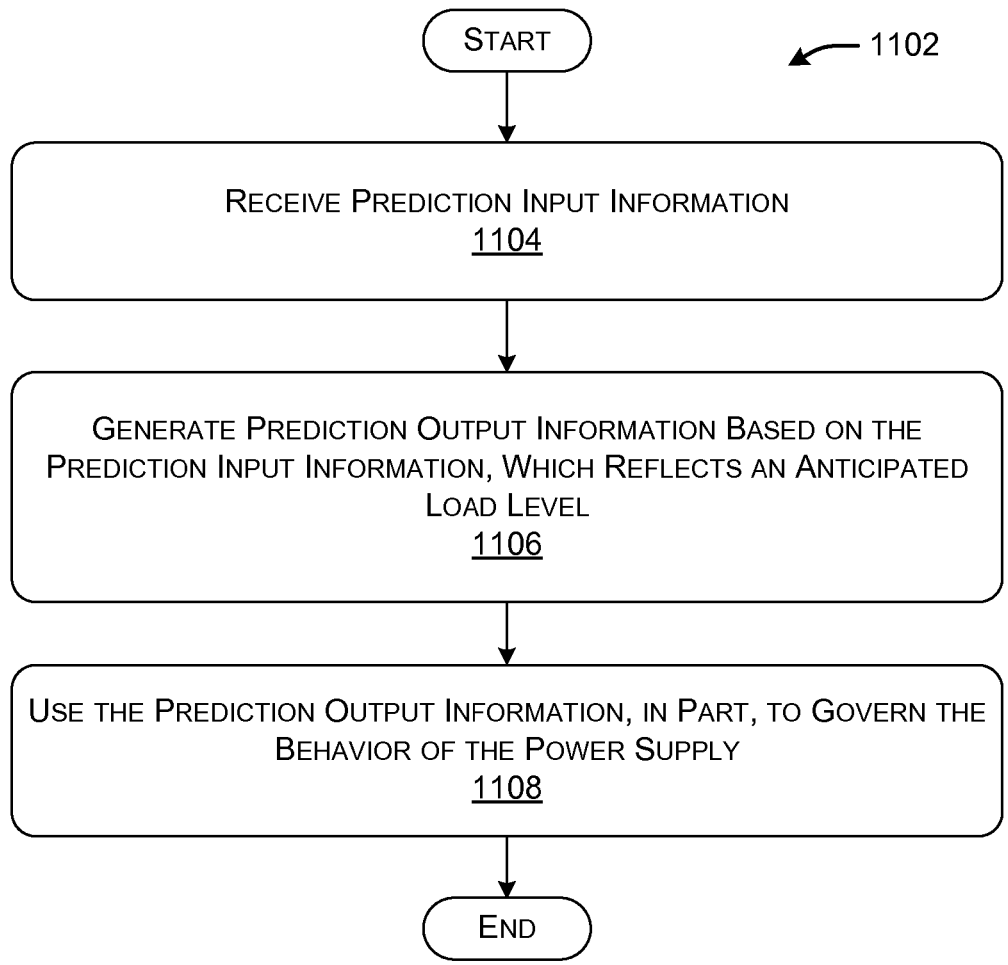
FIG. 11 shows a process which describes one manner of controlling the power supply (of FIG. 1) based on prediction output information.

FIGS. 9-11 show procedures that explain one manner of operation of the power supply 104 of FIG. 1. Since the principles underlying the operation of the power supply 104 have already been described in Section A, certain operations will be addressed in summary fashion in this section.

Starting with FIG. 9, this figure shows a process 902 which presents an overview of one manner of operation of the power supply 104 of FIG. 1. In block 904, the control logic 122 receives measurement information that reflects the rate of change in the load level of the load 106. For example, the measurement information may specify at least the voltage level at the output of the slow-response power source 108.

In block 906, the control logic 122 determines a control action based on the measurement information (and/or based on prediction output information). The control action may involve one or more of: (a) neither charging nor discharging the fast-response power source 110; (b) discharging the fast-response power source 110 to help power the load 106; (c) modifying or terminating load processes; (d) charging the fast-response power source 110; (e) diverting energy to the local and/or external resistive load banks (118, 120); (f) invoking or modifying one or more load processes, and so on. In block 908, the power supply 104 executes the identified control action.

FIG. 10 shows a process 1002 which describes one manner of controlling the power supply 104 of FIG. 1 for different load-change states. In block 1004, the control logic 122 determines whether the load level of the load is changing at a rate (if it changes at all) which can be effectively handled by the slow-response power source 108 alone, without the use of the fast-response power source 110. If so, in block 1006, the control logic 122 instructs the power supply 104 to primarily use the slow-response power source 108 to provide power to the load 106. The control logic 122 may also use this state as an opportunity to charge or discharge the fast-response power source 110 until it reaches a specified charge level (as described above in connection with FIG. 4).

In block 1008, the control logic 122 determines whether the load level of the load 106 is increasing at a rate that is too high for the slow-response power source 108 to handle by itself without the ameliorative effects of the power supply 104. If so, in block 1010, the control logic 122 instructs the power supply 104 to use the fast-response power source 110 to assist the slow-response power source 108 in providing power to the load 106. If the fast-response power source 110 becomes depleted, or if the rate of load increase is particularly high, the control logic 122 may also instruct the load 106 to terminate or modify load processes.

In block 1012, the control logic 122 determines whether the load level of the load 106 is decreasing at a rate that is too high for the slow-response power source 108 to handle by itself without the ameliorative effects of the power supply 104. If so, in block 1014, the control logic 122 may instruct the power supply 104 to discharge excess energy. More specifically, the power supply 104 may discharge excess energy by using the charger 116 to charge the fast-response power source 110. If the fast-response power source 110 reaches a maximum or specified charge level, or if the rate of load decrease is particularly steep, the control logic 122 may also instruct the load 106 to divert power to one or more power sinks, such as the local resistive load bank 118, the external resistive load bank 120, and/or one or more processes associated with the load 106 itself.

If the behavior of the load does not conform to any of the states described in blocks 1004, 1008, and 1012, the power supply 104 may have entered a failure state, associated with block 1016.

Although not specifically called out in FIG. 10, the power supply 104 may be considered to be operating in the second state when it starts up, e.g., due to the fact that the load is increasing at too sharp of a rate for the slow-response power source 108 to handle by itself without amelioration. Here, the power supply 104 may use the fast-response power source 110 to supply energy to the load 106, along with the slow-response power source 108. The power supply 104 can discontinue the use of the fast-response power source 110 once the slow-response power source 108 reaches a state in which it is able to handle the load 106 by itself.

FIG. 11 shows a process 1102 which describes one manner of controlling the power supply 104 based on prediction output information. In block 1104, the prediction module 124 of the power supply 104 receives prediction input information. In block 1106, the prediction module 124 uses the prediction input information to generate prediction output information, which reflects an anticipated load level of the load 106. In block 1108, the power supply 104 uses the prediction output information, in part, to govern the behavior of the power supply 104.

C. Representative Computing Functionality

Figure 12:
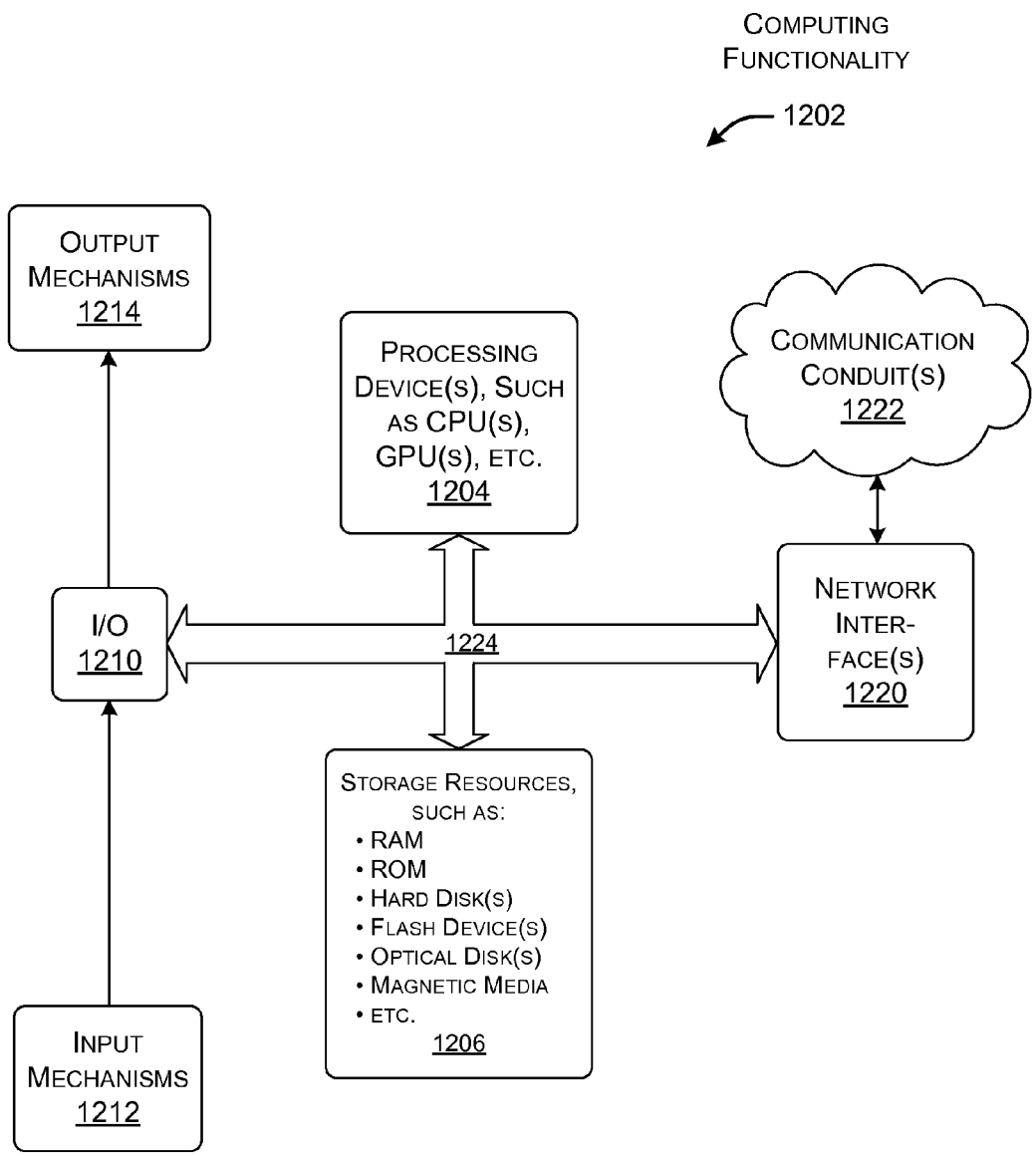
FIG. 12 shows illustrative computing functionality that can be used to implement control logic, where the control logic is a component of the power supply of FIG. 1.

FIG. 12 shows computing functionality 1202 that can be used to implement any aspect of the control logic 122 of FIG. 1. In all cases, the computing functionality 1202 represents one or more physical and tangible processing mechanisms.

In one implementation, the computing functionality 1202 can include one or more processing devices 1204, such as one or more central processing units (CPUs). The computing functionality 1202 can also include any storage resources 1206 for storing any kind of information, such as code, settings, data, etc. Without limitation, for instance, the storage resources 1206 may include any of: RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removal component of the computing functionality 1202. The computing functionality 1202 may perform any of the functions described above when the processing devices 1204 carry out instructions stored in any storage resource or combination of storage resources.

As to terminology, any of the storage resources 1206, or any combination of the storage resources 1206, may be regarded as a computer readable medium. In many cases, a computer readable medium represents some form of physical and tangible entity. The term computer readable medium also encompasses propagated signals, e.g., transmitted or received via physical conduit and/or air or other wireless medium, etc. However, the specific terms "computer readable storage medium" and "computer readable medium device" expressly exclude propagated signals per se, while including all other forms of computer readable media.

The computing functionality 1202 also includes an input/output module 1210 for receiving various inputs (via input mechanisms 1212), and for providing various outputs (via output mechanisms 1214). Illustrative input mechanisms 1212 may include measurement mechanisms for providing the measurement information that feeds into the control logic 122, such as voltage sensing mechanisms, current sensing mechanisms, charge level sensing mechanisms, etc. Illustrative output mechanisms 1214 may correspond to the components of the power supply 104 that are controlled by the control output information.

The computing functionality 1202 can also include one or more network interfaces 1220 for exchanging data with other devices via one or more communication conduits 1222. One or more communication buses 1224 communicatively couple the above-described components together.

The communication conduit(s) 1222 can be implemented in any manner, e.g., by a local area network, a wide area network (e.g., the Internet), point-to-point connections, etc., or any combination thereof. The communication conduit(s) 1222 can include any combination of hardwired links, wireless links, routers, gateway functionality, name servers, etc., governed by any protocol or combination of protocols.

Alternatively, or in addition, any of the control functions described in the preceding sections can be performed, at least in part, by one or more hardware logic components. For example, without limitation, the computing functionality 1202 can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc.

In closing, the description may have described various concepts in the context of illustrative challenges or problems. This manner of explanation does not constitute a representation that others have appreciated and/or articulated the challenges or problems in the manner specified herein. Further, the claimed subject matter is not limited to implementations that solve any or all of the noted challenges/problems.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A power supply comprising:
   a battery or an interface to a battery;
   a charger configured to charge the battery;
   a power regulating circuit configured to:
      draw power from a fuel cell and the battery; and
      power a load using the power drawn from the fuel cell and the battery; and
   one or more physical processing mechanisms configured via control logic to:
      determine a current load level measurement reflecting a current load level of the load;
      based at least on the current load level measurement, determine a target charge capacity for the battery, the target charge capacity being a first relatively high charge capacity when the current load level measurement is relatively low and being a second relatively low charge capacity when the current load level measurement is relatively high;

control the charger to charge the battery to the first relatively high charge capacity when the current load level measurement is relatively low and the fuel cell is handling the load without use of the battery;

control the charger to charge the battery to the second relatively low charge capacity when the current load level measurement is relatively high and the fuel cell is handling the load without use of the battery; and manage the current load level of the load as the current load level is experienced by the fuel cell by controlling the power regulating circuit to selectively draw the power to varying extents from the fuel cell and the battery.

2. The power supply of claim 1, comprising the battery.

3. The power supply of claim 1, wherein the battery comprises multiple batteries, and wherein the fuel cell comprises multiple fuel cells.

4. The power supply of claim 1, wherein the control logic configures the one or more physical processing mechanisms to:
when the fuel cell is handling the load without use of the battery and the current load level measurement increases rapidly, cause the power regulating circuit to begin powering the load with both the fuel cell and the battery.

5. The power supply of claim 1, the one or more physical processing mechanisms comprising a processing unit or a hardware logic component.

6. The power supply of claim 1, wherein the control logic configures the one or more physical processing mechanisms to:
when the fuel cell is handling the load without use of the battery, vary the target charge capacity inversely with the current load level measurement.

7. The power supply of claim 1, wherein the control logic configures the one or more physical processing mechanisms to:
for a first state in which the current load level measurement is not changing at a rate that is too great for the fuel cell to handle, cause the power regulating circuit to power the load using the fuel cell without the battery;
for a second state in which the current load level measurement is increasing at a rate that is too great for the fuel cell to handle without amelioration by the power supply, cause the power regulating circuit to use the battery to assist the fuel cell in powering the load; and
for a third state in which the current load level measurement is decreasing at a rate that is too great for the fuel cell to handle without amelioration by the power supply:
cause the charger to charge the battery to a level that is temporarily higher than the target charge capacity; and/or
cause the power supply to divert at least some of the power to one or more power sinks.

8. The power supply of claim 7, wherein the one or more power sinks comprise a resistive load bank and the control logic configures the one or more physical processing mechanisms to:
in the third state, cause the power supply to divert the at least some of the power to the resistive load bank.

9. The power supply of claim 7, wherein the one or more power sinks comprise a process associated with the load and the control logic configures the one or more physical processing mechanisms to:
in the third state, initiate or modify the process to consume excess power provided by the power supply.

10. The power supply of claim 7, wherein the control logic configures the one or more physical processing mechanisms to:
in the third state, begin diverting power to said one or more power sinks after the battery reaches the target charge capacity, or when a rate of change of the current load level measurement falls within a prescribed zone.

11. The power supply of claim 10, wherein the control logic configures the one or more physical processing mechanisms to:
assess the rate of change in the current load level measurement by measuring a voltage level at an output of the fuel cell.

12. The power supply of claim 1, wherein the power supply performs all power management functions associated with delivery of power from the fuel cell to the load.

13. The power supply of claim 1,
wherein the power regulating circuit includes an isolation transformer and an output regulation mechanism,
wherein the isolation transformer includes an input that is coupled to the fuel cell, and an output that is coupled to the output regulation mechanism, and
wherein the output regulation mechanism includes an input that is coupled to both the output of the isolation transformer and the battery, and an output that is coupled to the load,
further comprising a bypass switch that enables the fuel cell to deliver power directly to the output regulation mechanism, bypassing the isolation transformer, when the fuel cell is operating within a prescribed bypass zone.

14. The power supply of claim 1, wherein the charger, the battery, and the power regulating circuit operate in parallel with a bus that directly couples the fuel cell to the load.

15. The power supply of claim 1,
wherein the one or more physical processing mechanisms implement a prediction module which is configured to generate prediction output information based at least on prediction input information, the prediction output information reflecting an anticipated change in the load level of the load, and
wherein the control logic configures the one or more physical processing mechanisms to control the load based at least on the prediction output information.

16. A method comprising:
receiving measurement information that indicates a current load level of a load;
in a first state where the current load level is changing at a rate that can be handled by a fuel cell:
determining a target charge capacity of a battery based at least on the current load level of the load, the target charge capacity being a first relatively high charge capacity when the current load level is relatively low and being a second relatively low charge capacity when the currently load level is relatively high;
charging or discharging the battery to the first relatively high charge capacity when the currently load level is relatively low and to the second relatively low charge capacity when the current load level is relatively high; and
primarily powering the load with the fuel cell; and in a second state where the current load level is increasing too quickly for the fuel cell to handle alone, using the battery to assist the fuel cell in powering the load.

17. The method of claim 16, further comprising:
in a third state where the current load level is decreasing too quickly for the fuel cell to handle without amelioration, charging the battery using the fuel cell.

18. The method of claim 17, further comprising:
in the third state, diverting at least some of the power to one or more power sinks,
wherein said one or more power sinks include one or more of:
   a resistive load bank; and/or
   a process associated with the load, the process being initiated or modified by the diverting so as to consume excess power.

19. A power supply comprising:
a charger configured to charge a battery;
a power regulating circuit configured to:
   draw power from a fuel cell and the battery; and
   power a load using the power drawn from the fuel cell and the battery; and
one or more physical processing mechanisms configured via control logic to:
   in a first state where a current load level of the load is changing at a rate that can be handled by the fuel cell:
      determine a target charge capacity of the battery based at least on the current load level of the load, the target charge capacity being a first relatively high charge capacity when the current load level is relatively low and being a second relatively low charge capacity when the current load level is relatively high;
      control the charger to charge the battery to the first relatively high charge capacity when the currently load level is relatively low and to the second relatively low charge capacity when the current load level is relatively high; and
      control the power regulating circuit to primarily power the load with the fuel cell; and
   in a second state where the current load level is increasing too quickly for the fuel cell to handle without amelioration, control the power regulating circuit to use the battery to assist the fuel cell in powering the load.

20. The power supply of claim 19, wherein the one or more physical processing mechanisms are configured via the control logic to:
in a third state where the current load level is decreasing too quickly for the fuel cell to handle without amelioration, control the charger to charge the battery using power produced by the fuel cell.

21. The power supply of claim 19, wherein the one or more physical processing mechanisms are configured via the control logic to:
in a third state where the current load level is decreasing too quickly for the fuel cell to handle without amelioration, control the power regulating circuit to divert power to a power sink.

* * * * *